United States Patent
Thiessen et al.

(10) Patent No.: US 12,290,773 B1
(45) Date of Patent: *May 6, 2025

(54) FILTER CLEANING SYSTEM

(71) Applicant: Cyclone Filter Tools LLC, Murfreesboro, TN (US)

(72) Inventors: Jordan Thiessen, Murfreesboro, TN (US); Jeff Thiessen, Murfreesboro, TN (US)

(73) Assignee: Cyclone Filter Tools LLC, Murfreesboro, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/884,427

(22) Filed: Sep. 13, 2024

Related U.S. Application Data

(63) Continuation of application No. 18/654,317, filed on May 3, 2024, now Pat. No. 12,090,433, which is a continuation of application No. 18/387,637, filed on Nov. 7, 2023, now Pat. No. 11,998,865.

(51) Int. Cl.
  *B01D 41/04* (2006.01)
  *B08B 3/02* (2006.01)

(52) U.S. Cl.
  CPC .............. *B01D 41/04* (2013.01); *B08B 3/024* (2013.01); *B01D 2201/0415* (2013.01)

(58) Field of Classification Search
  CPC .. B08B 3/024; B01D 41/04; B01D 2201/0415
  See application file for complete search history.

(56) References Cited

U.S. PATENT DOCUMENTS

| | | |
|---|---|---|
| 3,898,414 A | 8/1975 | Hawley |
| 4,299,245 A | 11/1981 | Clapper |
| 4,552,655 A | 11/1985 | Granot |
| 4,585,019 A | 4/1986 | Jacobson |
| 4,668,384 A | 5/1987 | Holman |
| 4,834,883 A | 5/1989 | Lake |
| 5,263,503 A | 11/1993 | St. Jean |
| 5,330,065 A | 7/1994 | Bradley |
| 5,384,045 A | 1/1995 | Chmielewski et al. |
| 5,989,419 A | 11/1999 | Dudley et al. |
| 6,156,213 A | 12/2000 | Dudley et al. |
| 6,709,581 B2 | 3/2004 | Leckal |
| 8,857,452 B2 | 10/2014 | Martin |

(Continued)

FOREIGN PATENT DOCUMENTS

WO    WO 2013/134400 A1    9/2013

OTHER PUBLICATIONS

PCT International Patent Application No. PCT/US21/53337, International Search Report and Written Opinion of the International Searching Authority dated Dec. 28, 2021, 7 pages.

(Continued)

*Primary Examiner* — Benjamin L Osterhout
(74) *Attorney, Agent, or Firm* — Craig R. Miles; CR MILES P.C.

(57) ABSTRACT

A filter cleaning system including filter cleaning apparatus including a tubular mast rotatingly disposed on a support rod. One or more filter retainers adapted to retain a filter can be disposed on the tubular mast. A filter disposed on the tubular mast can rotate about the support rod. A fluid stream can be directed on the filter to clean the filter rotating about the support rod.

19 Claims, 13 Drawing Sheets

(56) References Cited

U.S. PATENT DOCUMENTS

| | | | |
|---|---|---|---|
| 8,997,999 | B1 | 4/2015 | DeRenzis et al. |
| 9,675,910 | B1 | 6/2017 | Wade et al. |
| 11,998,865 | B1 | 6/2024 | Thiessen et al. |
| 12,090,433 | B1 * | 9/2024 | Thiessen ............... B01D 41/04 |
| 2002/0166578 | A1 | 11/2002 | Leblond |
| 2004/0200770 | A1 | 10/2004 | Clary |
| 2006/0243309 | A1 | 11/2006 | Prescott et al. |
| 2007/0246087 | A1 * | 10/2007 | Crawford ............... B08B 9/023 |
| | | | 134/198 |
| 2008/0006290 | A1 | 1/2008 | Yamanaka et al. |
| 2011/0226291 | A1 | 9/2011 | Toussaint |
| 2013/0105374 | A1 | 5/2013 | Hegi |
| 2016/0319532 | A1 | 11/2016 | Fima |
| 2018/0065066 | A1 | 3/2018 | Morris et al. |
| 2019/0344205 | A1 | 11/2019 | Hicks |
| 2022/0193590 | A1 | 6/2022 | Szczap |
| 2022/0370932 | A1 | 11/2022 | Thiessen et al. |

OTHER PUBLICATIONS

U.S. Appl. No. 18/654,317, Office Action mailed Jun. 18, 2024.

* cited by examiner

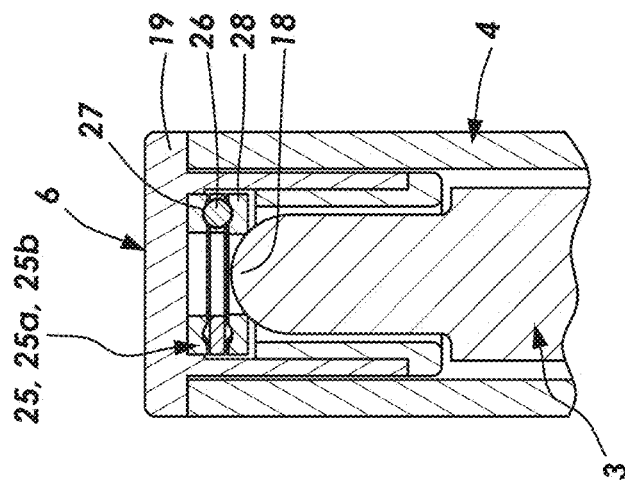
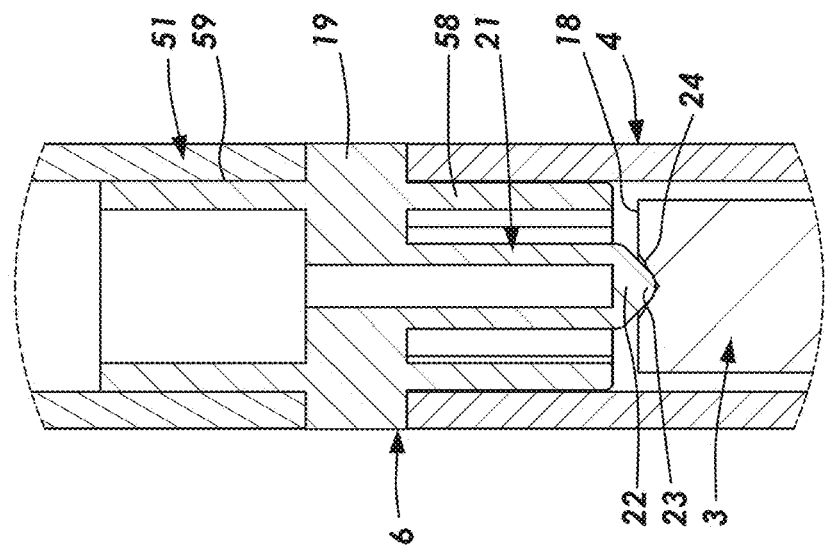
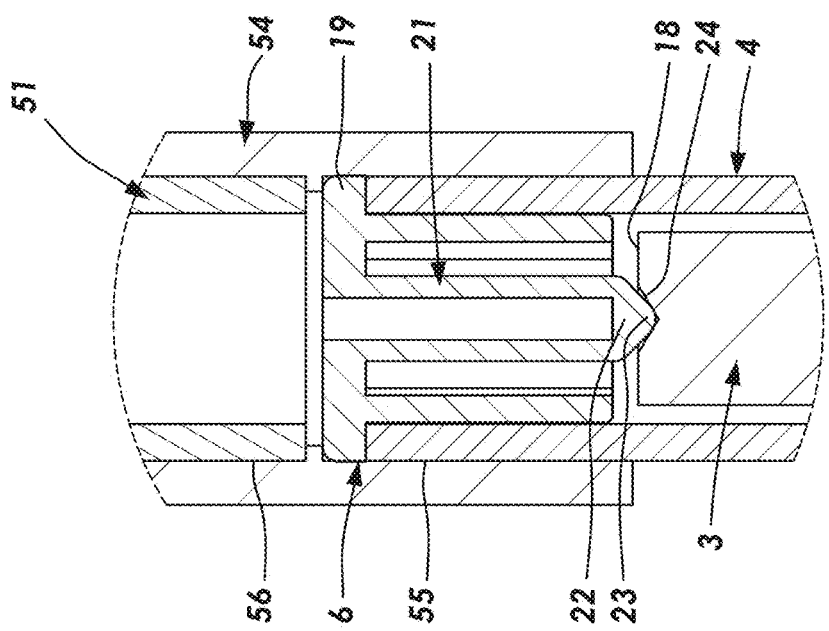

FILTER CLEANING SYSTEM

This United States Patent Application is a continuation of U.S. patent application Ser. No. 18/654,317, filed May 3, 2024, now U.S. Pat. No. 12,090,433, issued Sep. 17, 2024, which is a continuation of U.S. patent application Ser. No. 18/387,637, filed Nov. 7, 2023, now U.S. Pat. No. 11,998, 865, issued Jun. 4, 2024, each hereby incorporated by reference herein.

I. FIELD OF THE INVENTION

A filter cleaning system including filter cleaning apparatus including a tubular mast rotatingly disposed on a support rod. One or more filter retainers adapted to retain a filter can be disposed on the tubular mast. A filter disposed on the tubular mast can rotate about the support rod. A fluid stream can be directed on the filter to clean the filter rotating about the support rod.

II. BACKGROUND OF THE INVENTION

Filters can be periodically cleaned to remove contaminants that can increase filter pressure of the filter cartridge. In regard to pool and spa filters, contaminants in the liquid fluid stream, such as: leaves, algae, sand, skin cells, body oils, can be difficult to remove from the pleats in the filter. Similarly, with gas or air filters, contaminants, such as: airborne particulates and liquid aerosols, smoke, mold spores and pollen can be difficult to remove from the pleats in the filter.

A filter cleaning system which allowed rotation of the filter in relation to a fluid stream of liquid or gas would provide a substantial advantage in reducing the labor and cost in periodic cleaning of filter pleats to reduce filter pressure and ensuring filter longevity.

III. SUMMARY OF THE INVENTION

Accordingly, a broad object of particular embodiments of the invention can be to provide a filter cleaning apparatus including one or more of: a base, a rod connected to the base and a tubular mast having a mast closed end, wherein the rod inserted into the tubular mast contacts a mast closed end, wherein the tubular mast having the mast closed end contacting the rod is adapted to rotate about the rod, and a filter retainer positioned on the tubular mast can retain a filter that correspondingly rotates with the tubular mast about the rod.

Another broad object of the particular embodiments of the invention can provide a method of making the filter cleaning apparatus including one or more of: providing a base; connecting a rod to the base; inserting the rod into a tubular mast having a mast closed end, wherein the rod inserted into the tubular mast contacts the mast closed end, wherein the tubular mast having the mast closed end contacting the rod adapted to rotate about the rod; and positioning a filter retainer on the tubular mast.

Another broad object of the invention, can be to provide a method of using a filter cleaning apparatus including one or more of: positioning a base on a support surface; connecting a rod to the base; inserting the rod into a tubular mast having a mast closed end, wherein the rod inserted into the tubular mast contacts the mast closed end, wherein the tubular mast having the mast closed end contacting the rod adapted to rotate about the rod; and positioning a filter retainer on the tubular mast. In particular embodiments, the method can further include directing a fluid stream on the filter supported by the filter retainer on the tubular mast, wherein the force of the stream of fluid directed on the filter rotates the tubular mast on the rod and correspondingly rotates the filter in relation to the stream of fluid.

Naturally, further objects of the invention are disclosed throughout other areas of the specification, drawings, photographs, and claims.

IV. BRIEF DESCRIPTION OF THE DRAWINGS

FIG. 12A is an enlarged cross section view of a portion of FIG. 11 depicting a particular embodiment of a mast closed end having a projection extending to engage a central indentation in the second end of a support rod.

FIG. 12B is an enlarged cross section view of a portion of FIG. 11 depicting a particular embodiment of a mast closed end having a projection extending to engage a central indentation in the second end of a support rod.

FIG. 13 is an enlarged cross section view of a portion of FIG. 11 depicting a particular embodiment of a mast closed end retaining a bearing contacted by the second end of a support rod.

V. DETAILED DESCRIPTION OF THE INVENTION

Figure 1:
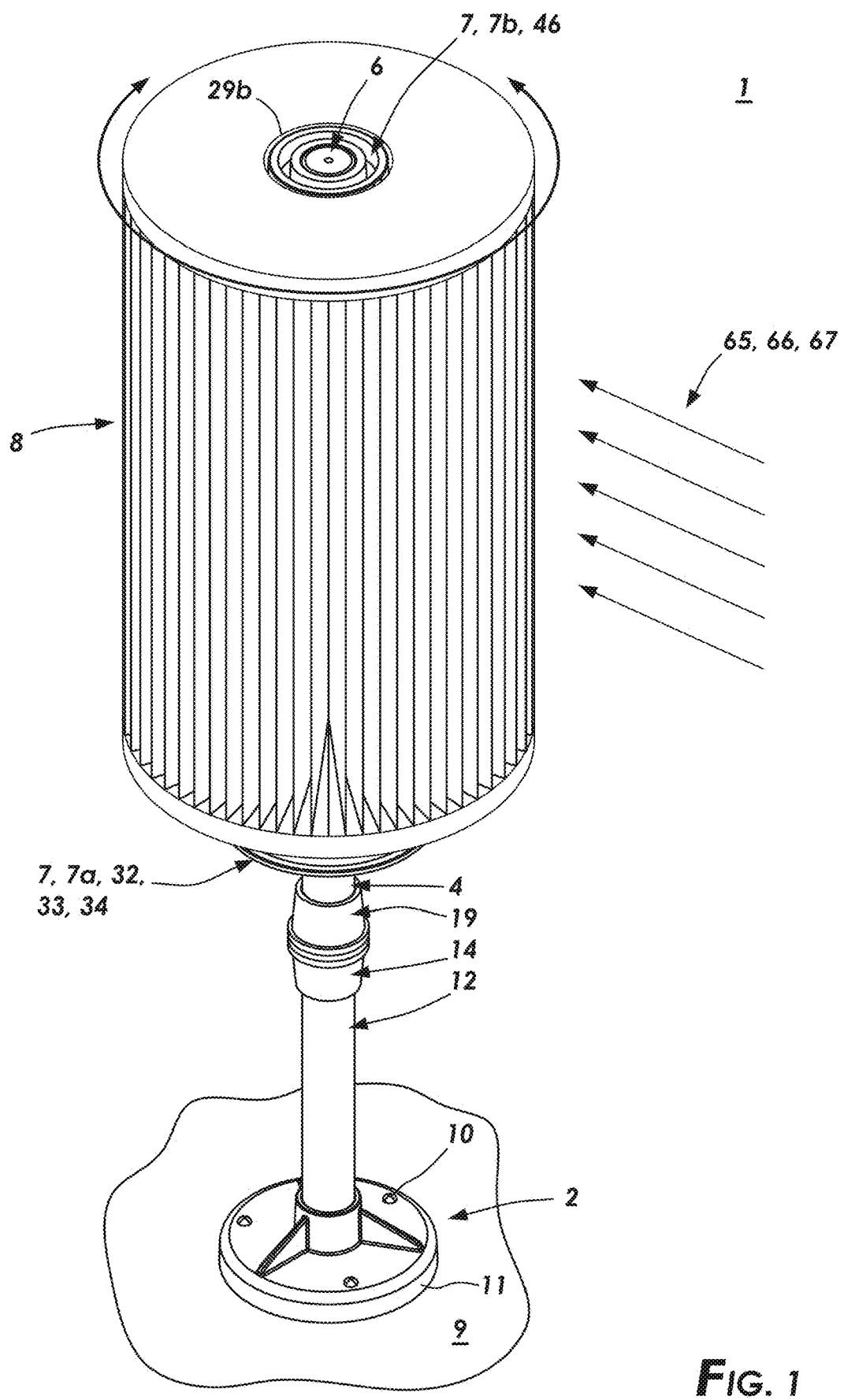
FIG. 1 is an illustrative embodiment of a filter cleaning apparatus retaining a filter having opposed filter end openings, wherein in response to a fluid stream the filter rotates about the longitudinal axis of the filter cleaning apparatus.

Generally, referring to FIGS. 1 through 16, which depict various embodiments of a filter cleaning apparatus (1) and methods of making and using the filter cleaning apparatus (1), including one or more of: a base (2) which supports a rod (3), a tubular mast (4) having length disposed between a mast open end (5) and a mast closed end (6), wherein the rod (3) inserted into the tubular mast (4) contacts the mast closed end (6), and wherein the tubular mast (4) having the mast closed end (6) contacting the rod (3) rotates about the rod (3), and one or more filter retainers (7) which can be positioned on the tubular mast (4) to retain the one or more filters (8). The term "filter" broadly encompasses any filter (8) that can be positioned on the tubular mast (4) and without limitation to the breadth of the foregoing includes as illustrative examples: liquid filters, water filters, gas filters, air filters, pleated filters, non-pleated filers, dust filters, shop vacuum filters, in ground pool filters, above ground pool filters, spa filters, swim spa filters, chiller filters, ice rink water filters, inflatable spa filters, or the like.

Now, with primary reference to FIGS. 1-7 and 14-16, in particular embodiments, the filter cleaning apparatus (1) can optionally include a base (2) which can be disposed or retained on a support surface (9). The base (2) can be configured to support a rod (3). While FIGS. 1-7 and 14-16 depict a circular base (2) secured to the support surface (8) by one or more fasteners (9), this is not intended to preclude embodiments of the filter cleaning apparatus (1) in which the base (2) is otherwise configured to support the rod (3), with or without fasteners (9), and of greater or lesser contact area with the support surface (9), and having a base periphery (11) defining any suitable form defining a base area adapted to support the rod (3), or in particular embodiments, can be configured as a stand having foldable legs, or in particular embodiments the base (2) may not be utilized and the rod (4) may be attached, connected, or coupled directly to or inserted in the support surface (9). In particular embodiments, the base (2) can include a tubular conduit (12) having a tubular conduit internal surface (13) configured to maintain the rod (3) in a spatially fixed outwardly extending relation to the support surface (9). In the embodiment depicted, the tubular conduit (2) terminates in a conduit end fitting (14) having an end fitting aperture (15) through which the rod (3) passes to be retained in spatially fixed extending relation to the base (2).

Now, with primary reference to FIGS. 4, 7, 10-13 and 16, embodiments of the rod (3) can include a rod linear portion (15) disposed between a first rod end (16) which can be secured to the base (2) or the support surface (8) and terminating at a second rod end (17).

Figure 10:
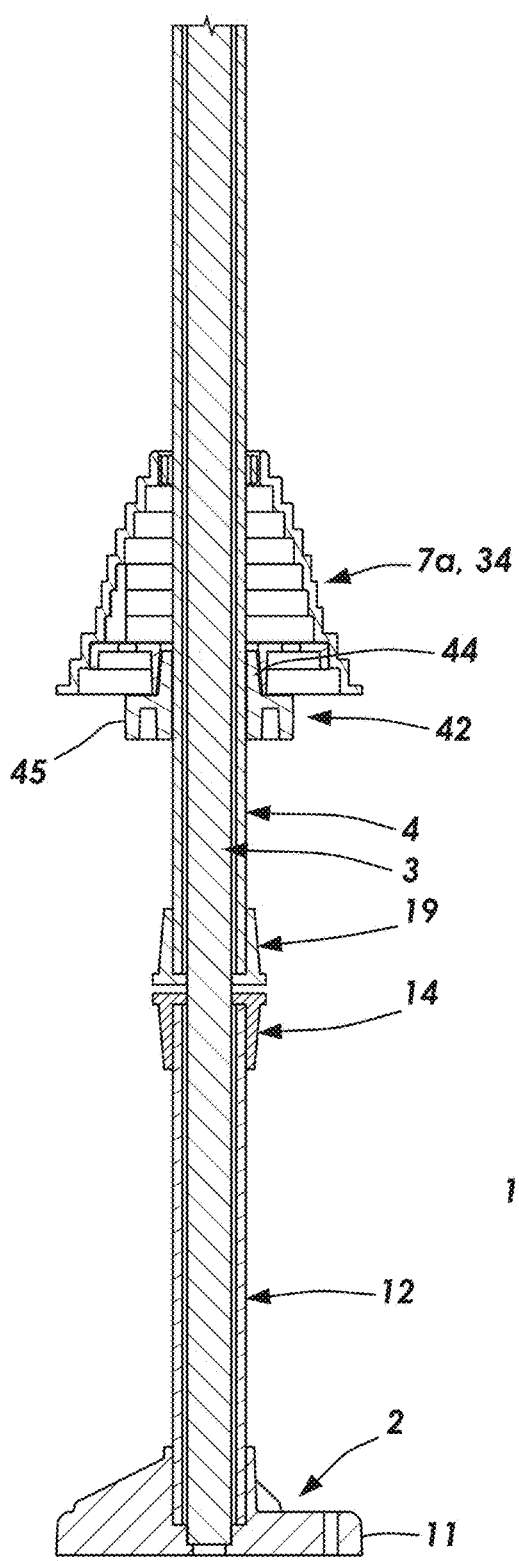
FIG. 10 is a cross section view 10-10 shown in FIG. 6.
Figure 11:
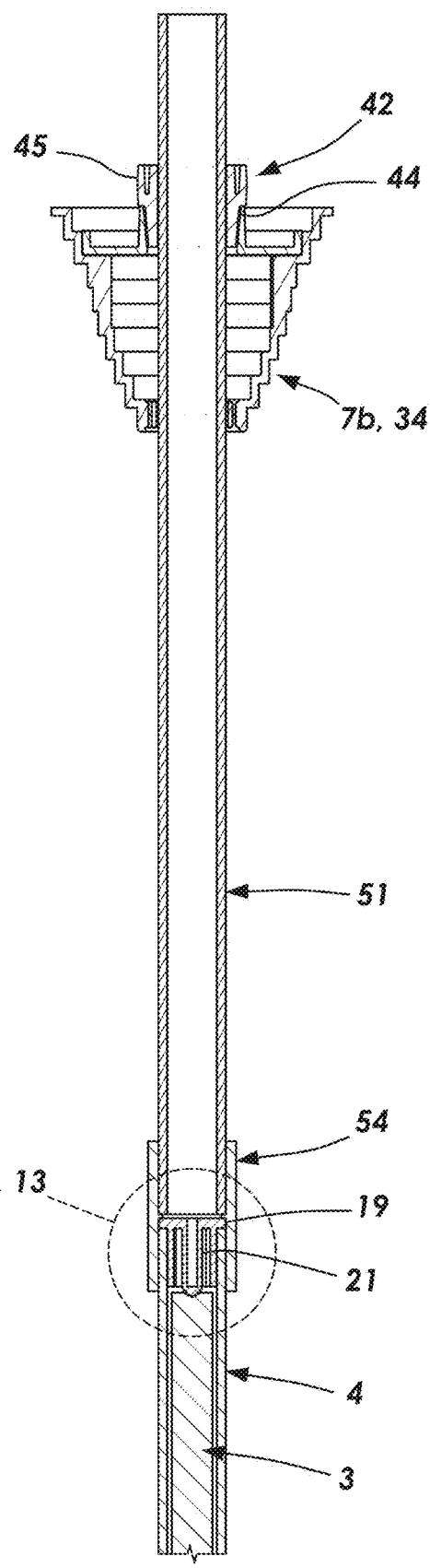
FIG. 11 is a cross section view 11-11 shown in FIG. 6.

Now, with primary reference to FIGS. 1 through 7 and 10 through 16, embodiments of the filter cleaning apparatus (1) can further include a tubular mast (4) disposed between a mast open end (5) and a mast closed end (6). In particular embodiments, the mast open end (5) can terminate in a mast end fitting (28) having a mast end fitting aperture (18) (as shown in the example of FIG. 10). The mast end fitting aperture (20) can rotatingly engage the rod (3) to restrict the translational movement of the tubular mast (4) in opposing directions to the rod (3) disposed in the tubular mast (4). The rod (3) can be inserted into the tubular mast (4) to contact the rod second end (18) to the mast closed end (6). The tubular mast (4) having the mast closed end (6) contacting the rod second end (18) can rotate about the rod (3).

Now, with primary reference to FIGS. 11, 12A, 12B, and 13, in particular embodiments, a projection (21) can extend from the mast closed end (6). The projection (21) can be configured to contact the rod second end (18) of the rod (3) inserted into the tubular mast (4). The projection (21) can taper approaching a projection end (22). The projection end (21) can contact the rod second end (18) of the rod (3) upon insertion of the rod (3) into the tubular mast (4). In particular embodiments the projection (21) tapers to a projection point (23). The projection point (23) can contact the rod second end (18) upon insertion of the rod (3) into the tubular mast (4). The projection (21) when tapered or tapered to a projection point (23) can reduce the contact area of the projection end (21) with the rod second end (18). This can confer the substantial advantage of reduced friction between the mast closed end (6) and the rod second end (18). In particular embodiments, the rod second end (18) can include a central indentation (24). The rod (3) inserted into the tubular mast (4) can contact the central indentation (24) with the projection end (21) extending from closed end (6) of the tubular mast (4). As shown in the examples of FIGS. 12A and 12B, the projection (21) in contact with the rod second end (18) or the central indentation (24) in the rod second end (18) disposes the rod second end (18) a distance from the tubular mast closed end (6) allowing the tubular mast to rotate or freely rotate about the rod (3).

Now, with primary reference to FIG. 13, in particular embodiments, the closed end (6) of the tubular mast (4) can retain a bearing (25). The rod (3) inserted into the tubular mast (4) can contact the bearing (25) to facilitate rotation of the tubular mast (4) about the rod (3). The second rod end (18) can be configured to engage the bearing (25) retained in the closed end (6) of the tubular mast (4). The bearing (25) can take any form that allows engagement of the bearing (25) with the rod second end (18) and allows the tubular mast (4) to rotate about the rod (3). The bearing (25) can include rolling elements (26) between an outer race (27) engaging the tubular mast (4) and an inner race (28) engaging the second rod end (18), thereby allowing the tubular mast (4) to rotate about the rod (3). As illustrative examples, the bearing (25) can comprise a thrust bearing (25a) or a roller bearing (25b).

Again, with primary reference to FIGS. 1 through 7 and 14 through 16, in particular embodiments, one or more filter retainers (7) can be positioned on the tubular mast (4). The one or more filter retainers (7) can be configured to engage a filter (8) positioned on the tubular mast (4). In particular embodiments, only one filter retainer (7) may be positioned on the tubular mast (4). In other embodiments, a pair of filter retainers (7a, 7b) may be positioned on the tubular mast (4). A first filter retainer (7a) can have the same configuration as the second filter retainer (7b), or the first filter retainer (7a) can have a different configuration than the second filter retainer (7b). The filter retainer (7) can be adapted to insert in a filter end opening (29) of a filter (7) to support the filter (7) on the tubular mast (4).

As depicted in FIGS. 5 through 9, in particular embodiments, the filter retainer (7) can taper between a filter retainer first end (30) and a filter retainer second end (31), and in certain instances, take the form of a cone (32) or a truncated cone (33). The filter retainer (7) in the form of a cone (32) or a truncated cone (33) can be slidably disposed in a filter end opening (29) until the filter retainer (7) engages the filter end opening (29) to support the filter (8) on the tubular mast (4).

Figure 8:
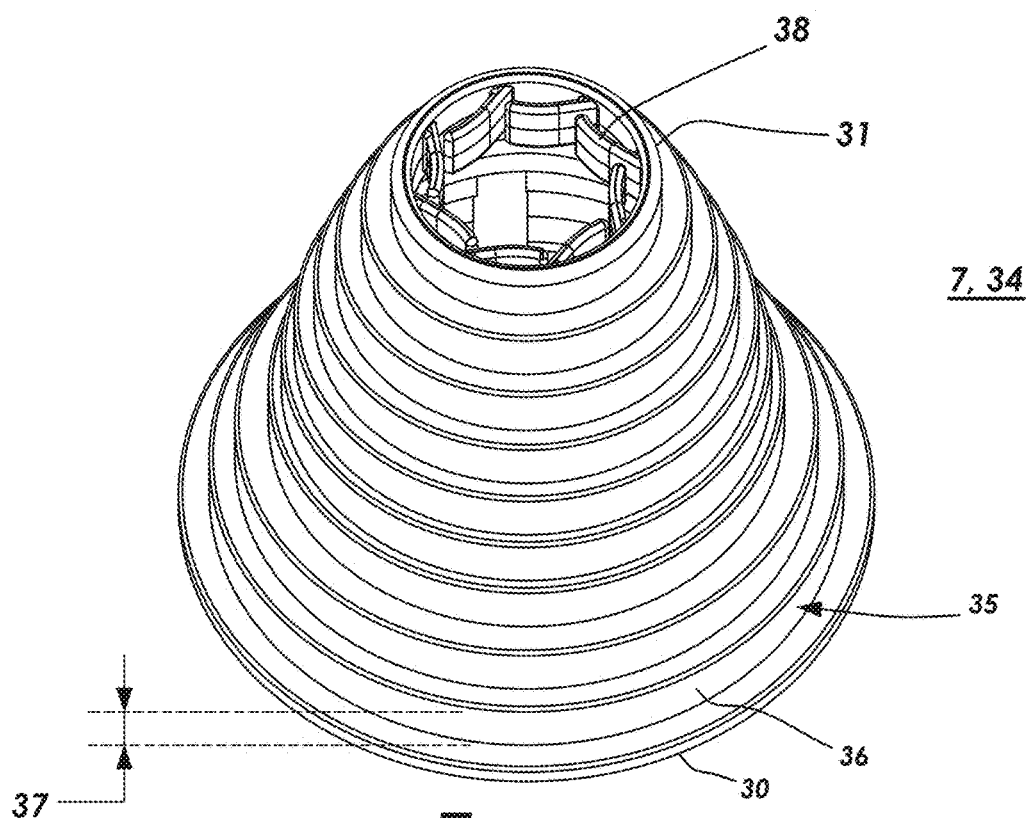
FIG. 8 is a perspective view of a particular embodiment of a filter retainer.
Figure 9:
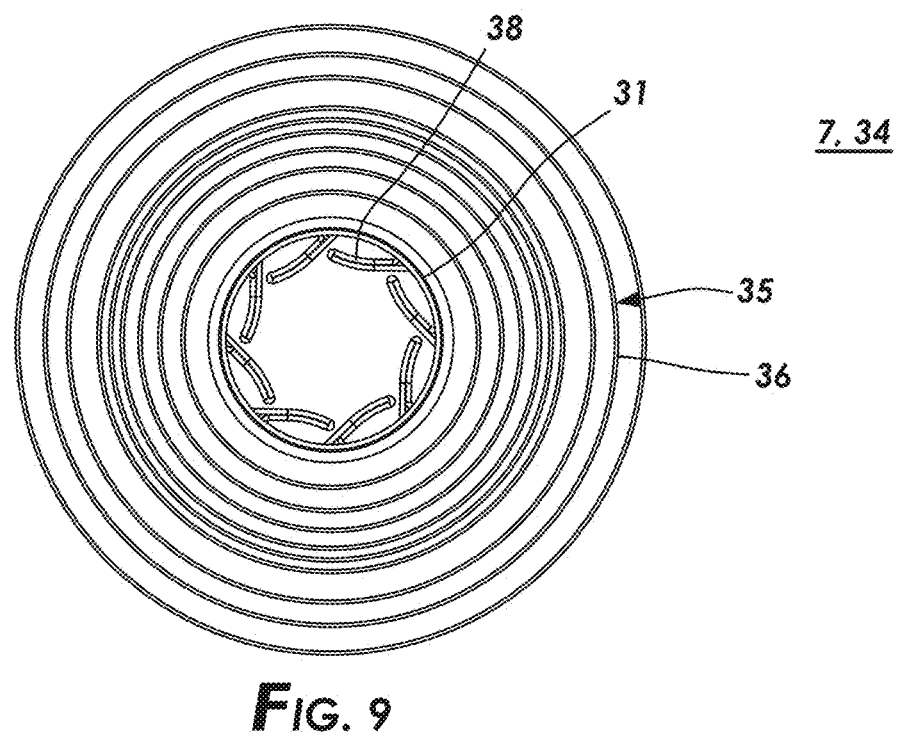
FIG. 9 is a top plan view of the particular embodiment of a filter retainer depicted in FIG. 8.

Now, with primary reference to FIGS. 8 and 9, in particular embodiments, the filter retainer (7) can take the form of a stepped annular conical reduction (34) between the filter retainer first end (30) and the filter retainer second end (31). The stepped annular conical reduction (34) can comprise one integrated structure or can comprise discrete components including two or more annular members (35) in which each consecutive annular member (35) approaching the filter retainer second end (31) has a lesser diameter than the preceding annular member (35). Each annular member (35) can have an annular member sidewall (36) defining a step height (37) of each of the annular members (35). The diameter of the two or more annular members (35) can be configured to insertingly engage a corresponding two or more different diameter filter end openings (29) of the filters (8) that can be positioned on the tubular mast (4). The annular member (35) proximate the filter retainer first end (30) can have a diameter to engage the anticipated largest diameter filter end opening (29) of a filter (8) and the annular member (35) distal from the filter retainer first end (30) can have a diameter to engage the anticipated smallest diameter filter end opening (29) of a filter (8). The diameter of the two or more annular members (35) disposed in the stepped annular conical reduction (34) can correspond to the diameters of the filter end openings (29) of filters (8) commercially available or anticipated to require repeated cleaning. The filter retainer (7) in the form of a stepped annular conical reduction (34) can be slidably disposed in a filter end opening (29) until one of the annular member sidewalls (36) rests adjacent or engages the filter end opening (39) with the filter (8) supported on the succeeding larger diameter annular member (35) in the stepped annular conical reduction (34).

Now, with primary reference to FIGS. 8 and 9, in particular embodiments, the filter retainer (7) formed as a truncated cone (33) or stepped annular conical reduction (34) can include a plurality of flexibly resilient leaves (38) radially inwardly extending from the filter retainer second end (31). The plurality of flexibly resilient leaves (38) can be adapted to outwardly radially flex to allow slidable engagement with the tubular mast (4). The plurality of flexibly resilient leaves (38) in the flexed condition about the tubular mast (4) can allow for slidable adjustment of the filter retainer (7) along the length of the tubular mast (4).

Again, with primary reference to FIGS. 6, 7, 10, 11, and 16, in particular embodiments, the filter retainer (7) configured as a truncated cone (33) or stepped annular conical reduction (34) can include an annular disk (39). The annular disk (39) can be disposed between a disk external annular sidewall (40) configured to secure to filter retainer first end (30) and a disk internal annular sidewall (41) configured to slidably engage the tubular mast (4), or slidably engage a mooring hub (42). In the first instance, the disk internal annular sidewall (41) defines a disk passthrough (43) adapted to slidably engage the disk internal annular sidewall (41) with the tubular mast (4), thereby the filter retainer (7) can be slidably adjusted to and retained at a position along the length of the tubular mast (4). In the second instance, embodiments can include a mooring hub (42) having a mooring hub tubular body (44) and a mooring hub annular shoulder (45) circumferentially coupled in part or in whole to the mooring hub tubular body (44). The mooring hub tubular body (44) can be positioned along the tubular mast (4). The mooring hub tubular body (44) be disposed in the disk passthrough (43) with the annular disk (39) engaging the mooring hub annular shoulder (45). The mooring hub (42) can comprise an elastomer having sufficient elasticity to be slidably positioned on the tubular mast (4), but having sufficient grip to remain in a substantial fixed spatial position on the tubular mast (4) during normal use. Elastomers suitable for use in molding, forming or fabricating the mooring hub (42) can comprise as examples: thermoplastic polyurethane or thermoplastic elastomer. The mooring hub (42) can have a durometer of about Shore A 40 to about Shore A 80. In particular embodiments, the mooring hub (42) can have a durometer of about Shore A of 50 to about Shore A 60.

Figure 3:
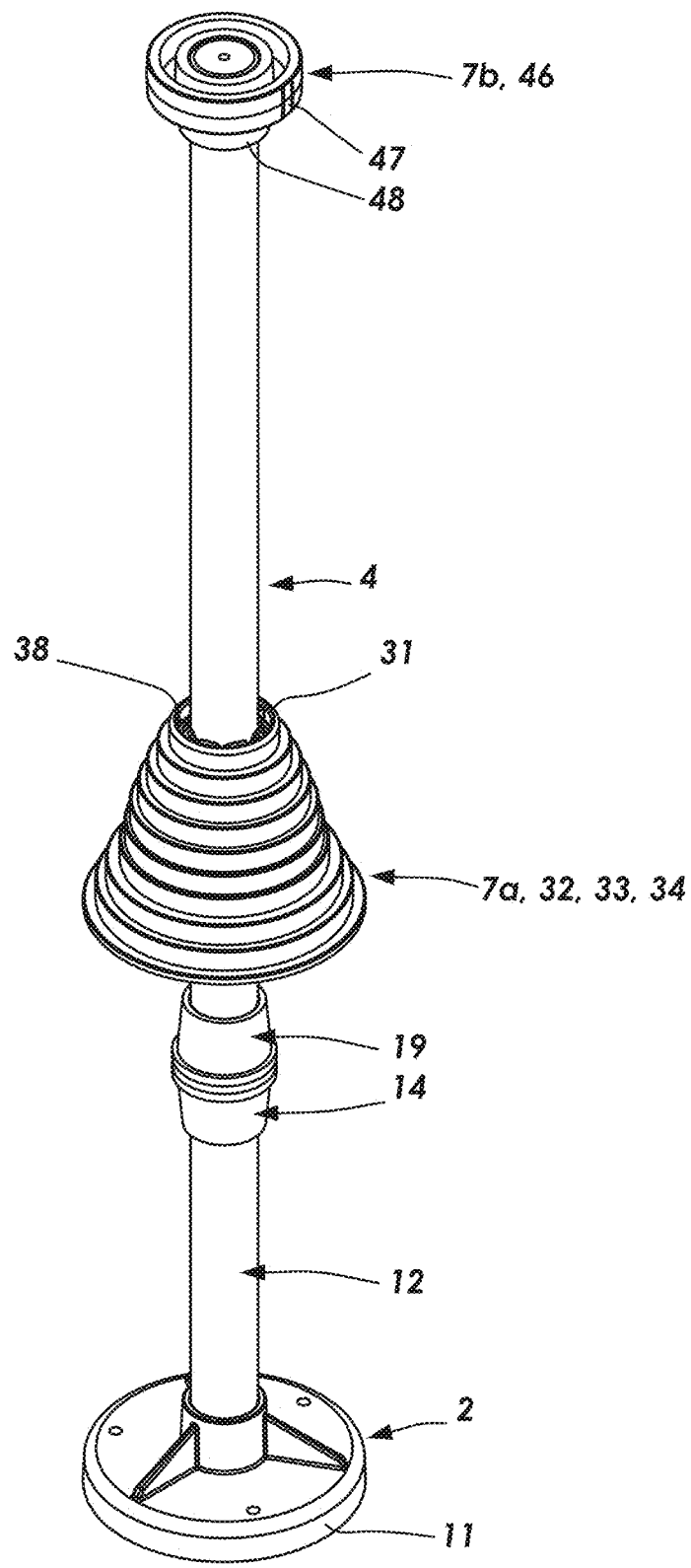
FIG. 3 is a side elevation view of the embodiment of the filter cleaning apparatus retaining the filters shown in FIGS. 1 and 2.
Figure 4:
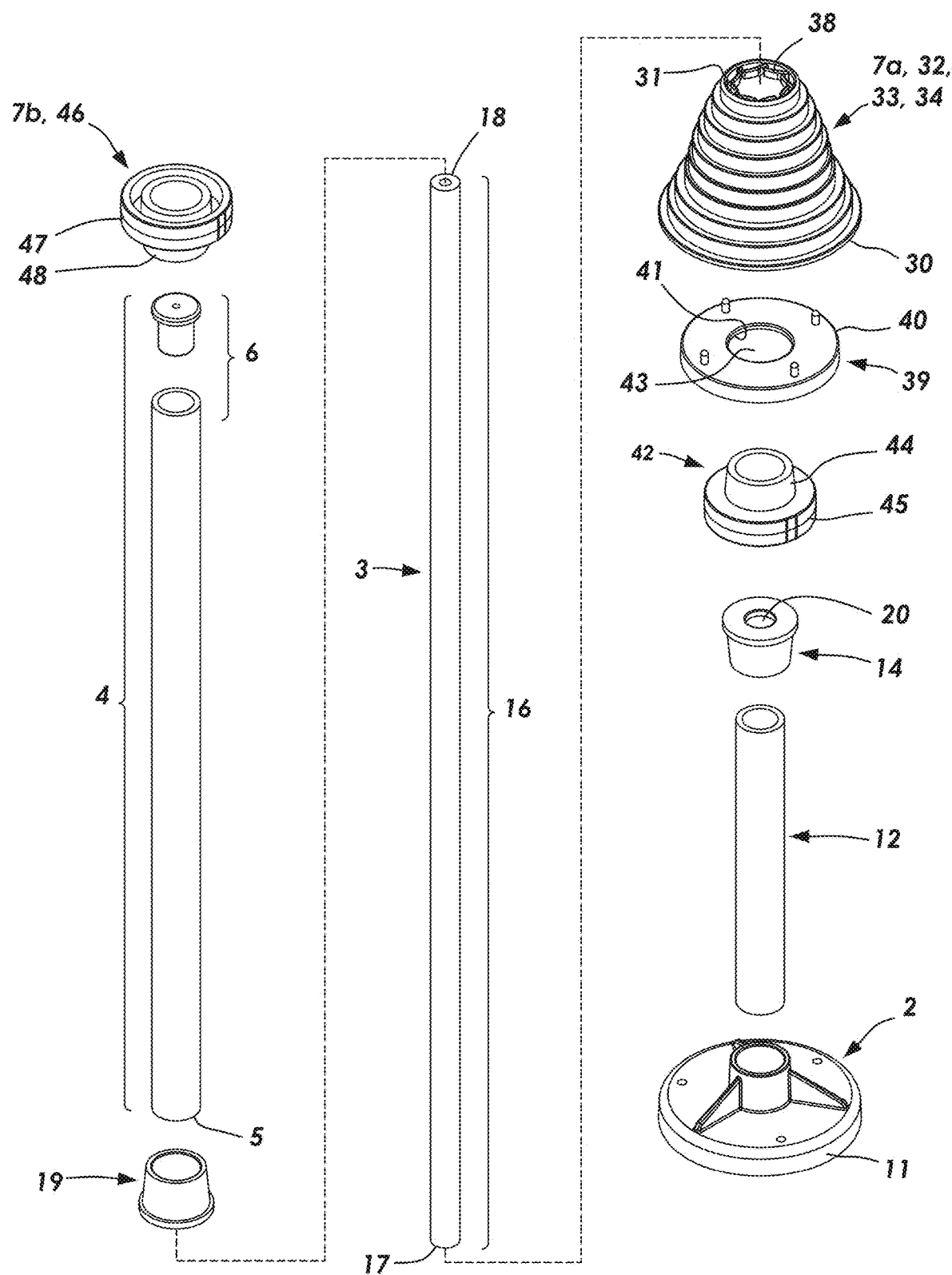
FIG. 4 is an exploded view of the embodiment of the filter cleaning apparatus depicted in FIG. 3.

Now, with primary reference to FIGS. 1, 3 and 4, in particular embodiments, the filter retainer (20) can comprise a filter retainer collar (46) including an annular collar (47) circumferentially disposed about a tubular collar retainer body (48). The tubular collar retainer body (48) can be configured to slidably engage the tubular mast (4). The annular collar (47) can have an annular collar external sidewall (49) configured to engage a filter end opening (29) of a filter (8) as shown in the illustrative example of FIG. 1.

Figure 2:
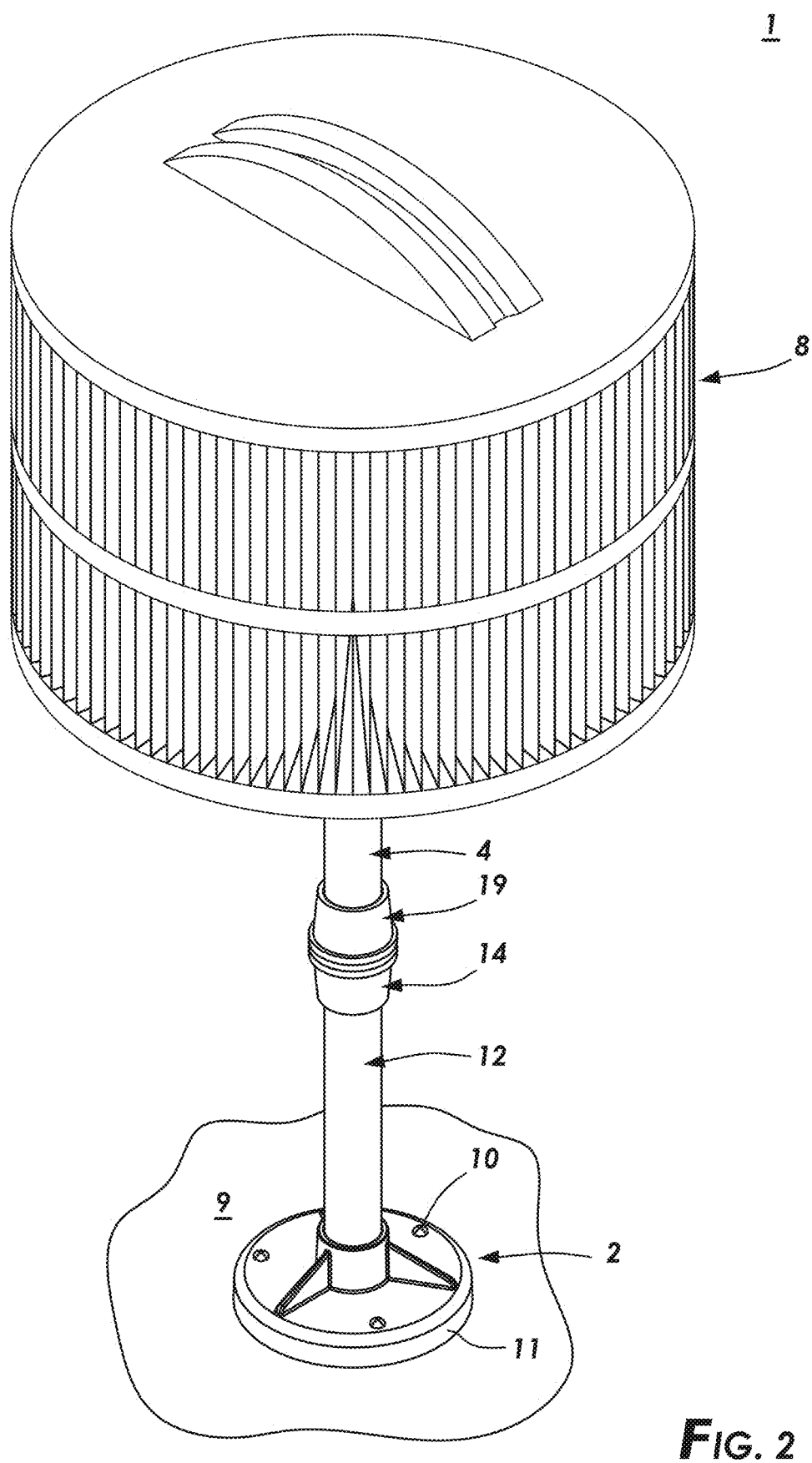
FIG. 2 is an illustrative embodiment of a filter cleaning apparatus retaining a filter having only one filter end opening.

Now, with primary reference to FIGS. 2 through 4, in other particular embodiments, the annular collar external sidewall (49) can be configured to pass through a filter end opening (29) to reside within the filter interior space (50) of the filter (8). Thus, for filters (8) having only one filter end opening (29), as shown in the illustrative example of FIG. 2, the annular collar external sidewall (49) can be disposed within the filter interior space (50 of the filter (8) to restrict the translational movement of the filter (8) in opposed directions about the tubular mast (4).

The tubular collar retainer body (48) can comprise an elastomer having sufficient elasticity to be slidably positioned along the tubular mast (4) but sufficient grip to remain in a substantial fixed spatial position on the tubular mast (4) during normal use. Elastomers suitable for use in molding, forming or fabricating the filter retainer collar (46) having an annular collar (47) circumferentially disposed about a tubular retainer body (48) can comprise, as examples: thermoplastic polyurethane or thermoplastic elastomer. The filter retainer collar (46) can have a durometer of about Shore A 40 to about Shore A 80. In particular embodiments, the filter retainer collar (46) can have a durometer of about Shore A of 50 to about Shore A 60.

The filter retainers (7) in various combinations of a truncated cone (33), a stepped annular conical reduction (34) and/or filter retainer collar (46) disposed individually or in combination on the tubular mast (4) allows a numerous and wide variety of different filters (8) to be positioned on the tubular mast (4) for filter cleaning.

Again, with primary reference to FIGS. 1, 3 and 4, a particular embodiment of the filter cleaning apparatus (1) includes a first filter retainer (7a) positioned on the tubular mast (4), wherein the first filter retainer (7a) comprises a truncated cone (33) disposed between a first filter retainer first end (30a) and a first filter retainer second end (31a), or a first stepped annular conical reduction (34a) disposed between the first filter retainer first end (30a) and the first filter retainer second end (31a), and wherein the second filter retainer (7b) comprises a filter retainer collar (46). The first filter retainer (7a) can be positioned on the tubular member (4) and slidably engaged with a filter first end opening (29a) with tubular mast closed end (6) passing through a filter second end opening (29b). The filter retainer collar (46) can be slidably disposed on the tubular mast (4) to engage the annular collar (46) with the filter second end opening (29b). The first filter retainer (7a) and the second filter retainer (7b) can be disposed in fixed spatial relation on the tubular mast (4) to retain the filter (8) on the tubular mast (4). The filter (8) retained on the tubular mast (4) can rotate freely about the rod (3).

Now, with primary reference to FIGS. 2, 3 and 4, a particular embodiment of the filter cleaning apparatus (1) includes a first filter retainer (7a) positioned on the tubular mast (4), wherein the first filter retainer (7a) comprises a truncated cone (33) disposed between a first filter retainer first end (30a) and a first filter retainer second end (31a), or a first stepped annular conical reduction (34a) between the first filter retainer first end (30a) and the first filter retainer second end (31a), and wherein the second filter retainer (7b) comprises a filter retainer collar (46). In the example of FIG. 2, the filter (8) has only a single filter end opening (29). The first filter retainer (7a) and the second filter retainer (7b) can be positioned on the tubular member (4) and the second filter retainer (7*b*) inserted into the filter end opening (29) and disposed inside the interior space (50) of the filter (8) to restrict translational movement of the tubular mast (4) in the interior space (50) of the filter (8). The first filter retainer (7*a*) can be slidably engaged with the filter end opening (29). The filter (8) retained by the first filter retainer (7*a*) and the second filter retainer (7*b*) on the tubular mast (4) can rotate freely about the rod (3).

Figure 5:
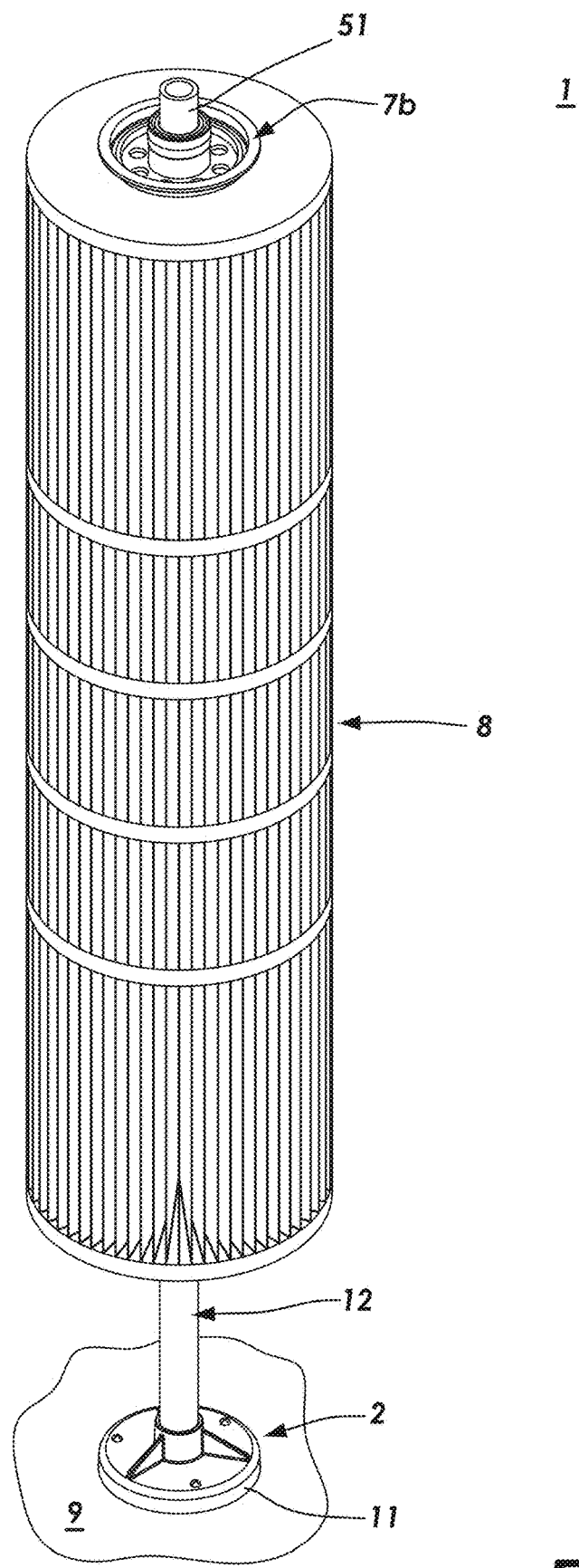
FIG. 5 is an illustrative embodiment of a filter cleaning apparatus retaining a filter having opposed filter end openings.
Figure 6:
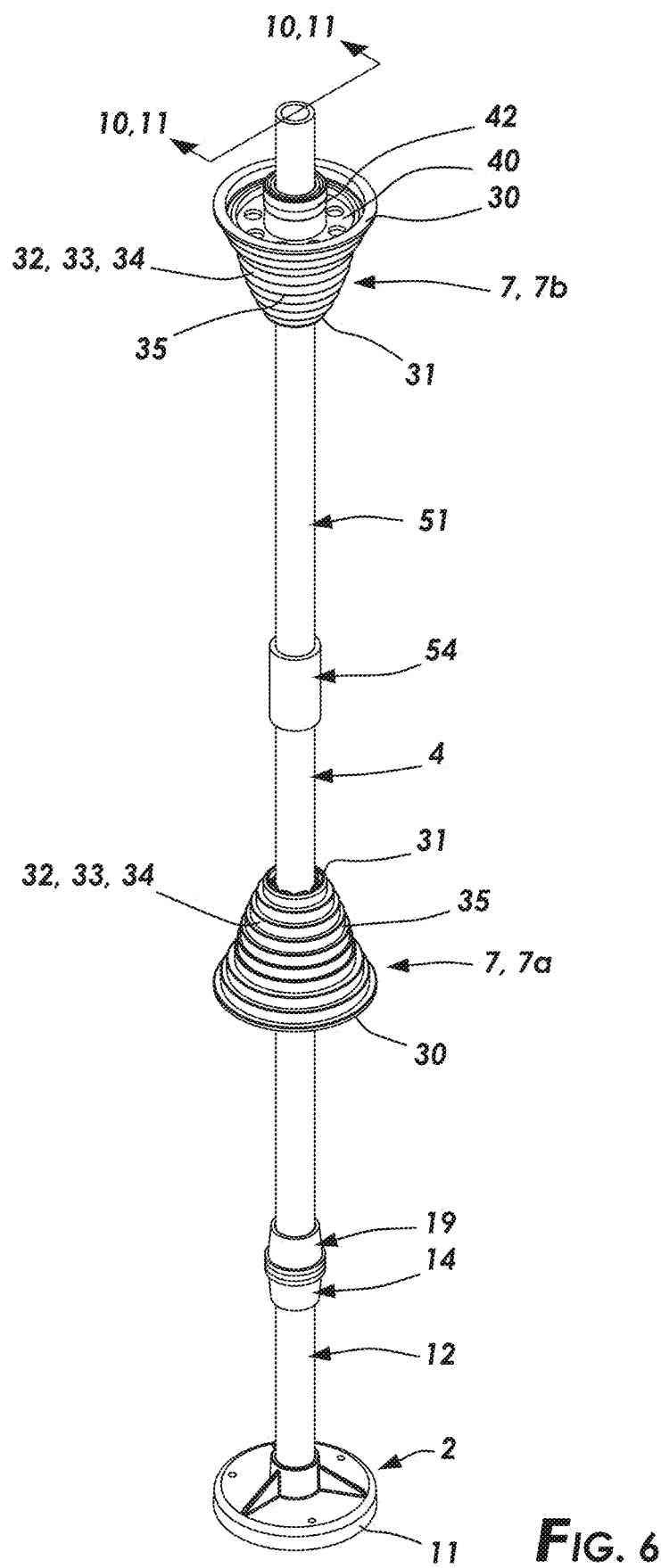
FIG. 6 is a side elevation view of the embodiment of the filter cleaning apparatus retaining the filter shown in FIG. 5.
Figure 7:
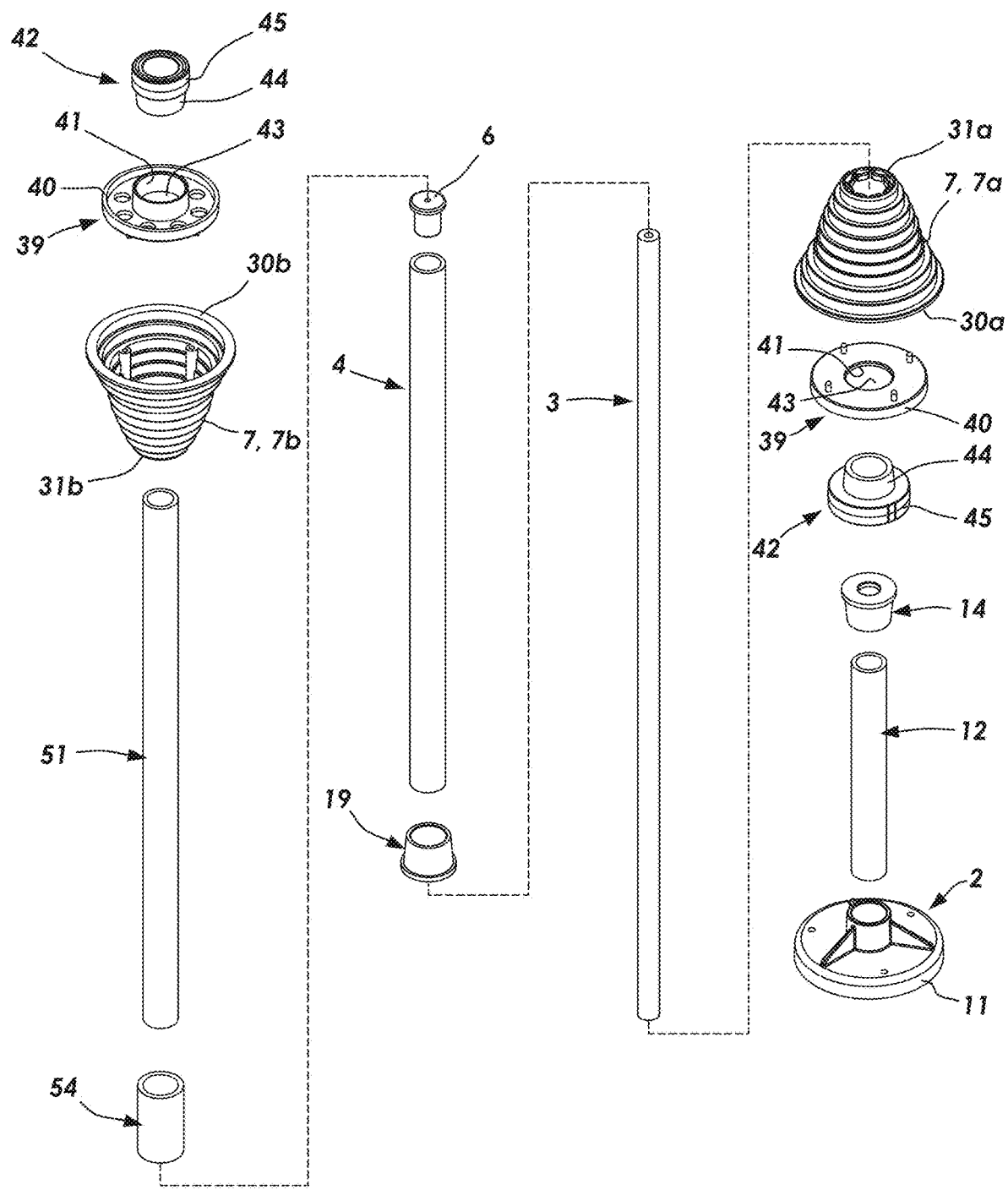
FIG. 7 is an exploded view of the embodiment of the filter cleaning apparatus depicted in FIG. 6.

Now, with primary reference to FIGS. 5 through 7, a particular embodiment of the filter cleaning apparatus (1) includes a first filter retainer (7*a*) positioned on the tubular mast (4), wherein the first filter retainer (7*a*) comprises a first truncated cone (33*a*) disposed between a first filter retainer first end (30*a*) and a first filter retainer second end (31*a*), or a first first stepped annular conical reduction (34*a*) disposed between the first filter retainer first end (30*a*) and the first filter retainer second end (31*a*), and wherein the second filter retainer (7*b*) comprises a second truncated cone (33*b*) disposed between a second filter retainer first end (30*b*) and a second filter retainer second end (31*b*), or a second stepped annular conical reduction (34) disposed between the second filter retainer first end (30*b*) and the second filter retainer second end (31*b*). The first filter retainer (7*a*) can be positioned on the tubular member (34) and slidably engaged with a filter first end opening (29*a*) of a filter (8) with tubular mast closed end (6) passing through the filter second end opening (29*b*) of the filter (8). The second filter retainer (7*b*) can be positioned on the tubular member (4) and slidably engaged with a filter second end opening (29*b*) of the filter (8). The first filter retainer (7*a*) and the second filter retainer (7*b*) be disposed in fixed spatial relation on the tubular mast (4) to retain the filter (8) on the tubular mast (4). The filter (8) retained on the tubular mast (4) can rotate freely about the rod (3).

Now, with primary reference to FIGS. 7 through 11 and 12A and 12B, in particular embodiments, the filter (8) to be cleaned may have a filter length that exceeds a mast length of the tubular mast (4). In these instances, the filter cleaning apparatus (1) can further include a mast axial extension (51) configured to connect to the mast closed end (6) to increase the mast length of the tubular mast (4). The mast axial extension (51) can have a length disposed between a mast axial extension first end (52) and a mast axial extension second end (53). The mast axial extension first end (52) can be configured to couple in fixed spatial relation to the tubular mast closed end (6), thereby extending the mast length of the tubular mast (4) by the additional length of the mast axial extension (51). The mast axial extension (51) coupled to the tubular mast (4) can rotate about the rod (3). The mast axial extension (51) can be coupled to the tubular mast closed end (6) using a connector (54) having opposed coupler open ends (55, 56) which correspondingly receive the mast closed end (6) and the mast axial extension first end (52); however, this example is not intended to preclude other configurations of the connector (54) which serve to releasably fix the mast axial extension (51) to the tubular mast (4). By way of illustrative example, the connector (54) can comprise a mast cap (57) having mast cap first closed end (58) and mast cap second closed end (59), whereby the mast cap first closed end (58) can be inserted in the tubular mast (4) to generate the mast closed end (6) and the mast cap second closed end (59) can be inserted into the mast axial extension first end (52). In particular embodiments, the mast cap first closed end (58) can further include the projection (21) which contacts the rod second end (18). The mast axial extension (51) connected to the mast closed end (6) can increase the length of the tubular mast (4) can receive one or more filter retainers (7) in the various embodiments above described and depicted in the figures.

Figure 14:
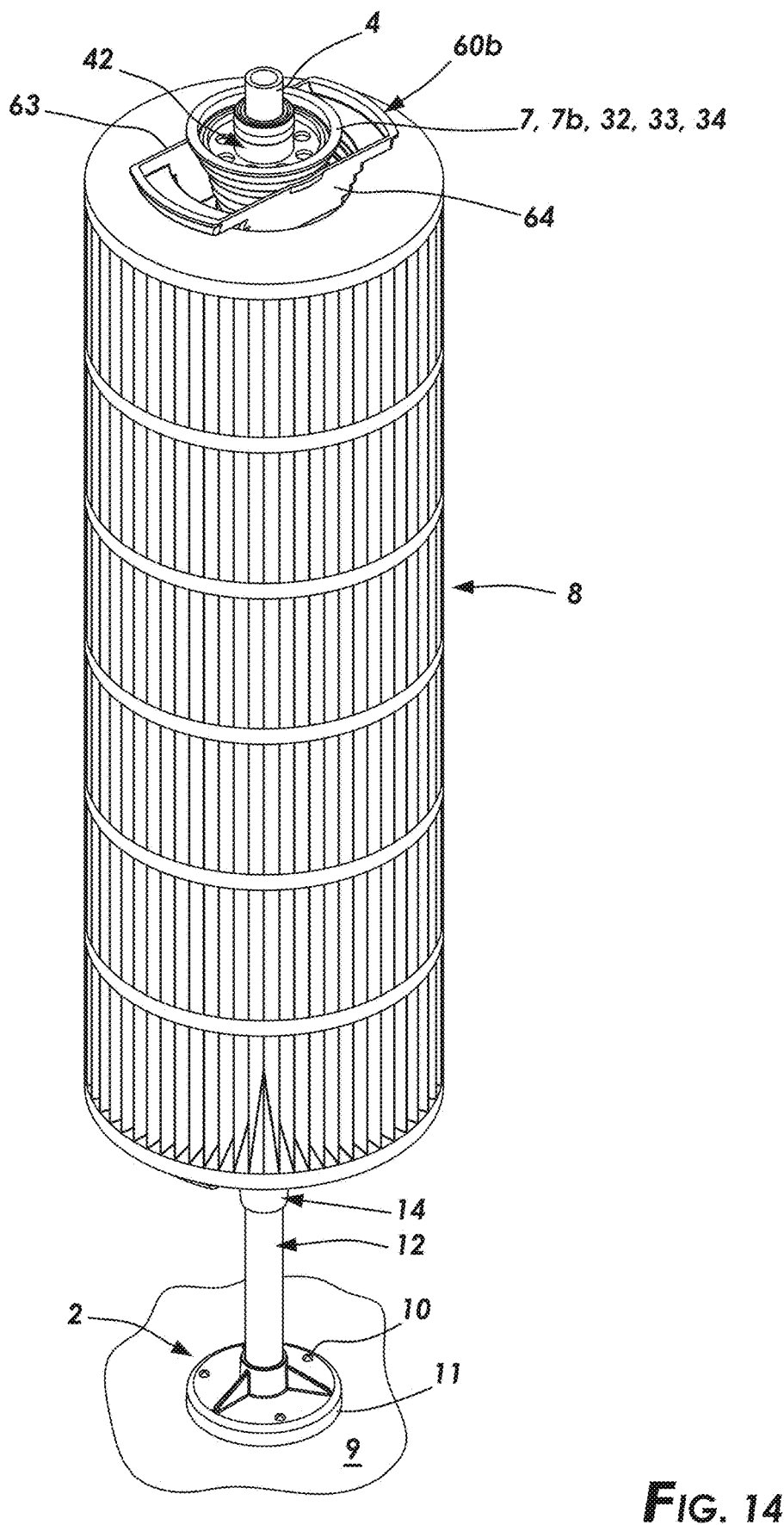
FIG. 14 is an illustrative embodiment of a filter cleaning apparatus retaining a filter having large opposed filter end openings.
Figure 15:
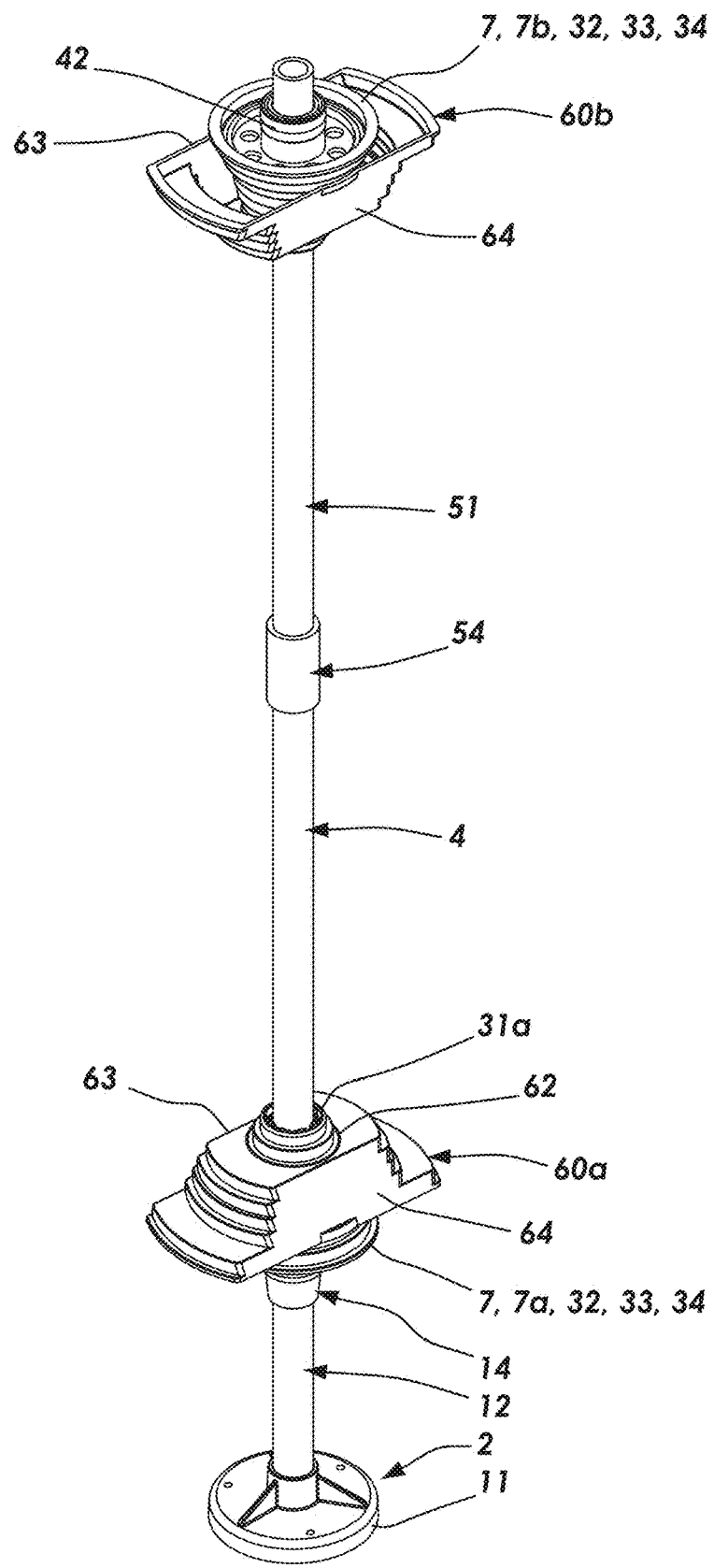
FIG. 15 is a side elevation view of the embodiment of the filter cleaning apparatus retaining the filter shown FIG. 14.
Figure 16:
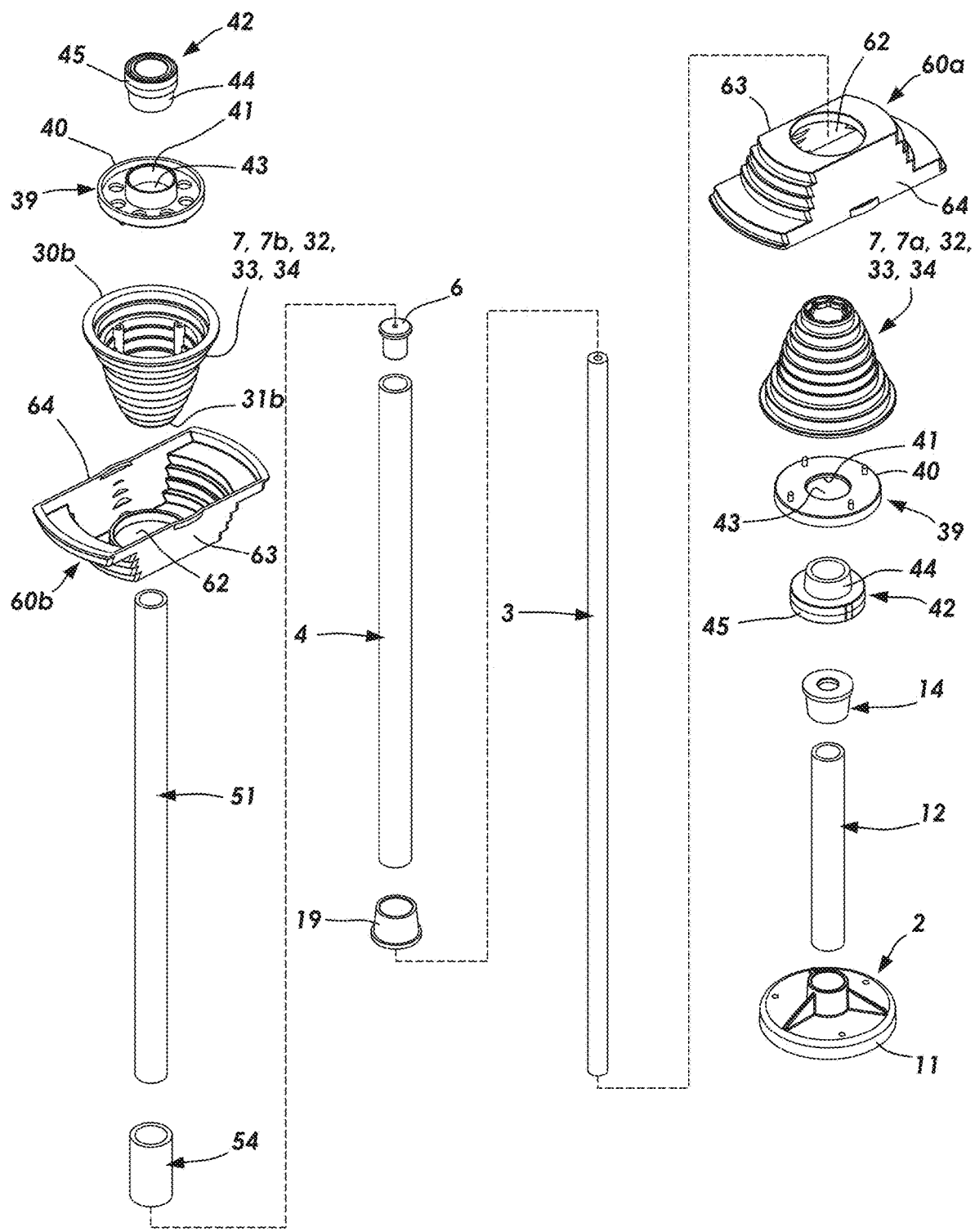
FIG. 16 is an exploded view of the embodiment of the filter cleaning apparatus depicted in FIG. 15.

Now, with primary reference to FIGS. 14 through 16, in particular embodiments, the filter cleaning apparatus (1) can further include a retainer radial extension (60) configured to be disposed over the first filter retainer (7*a*) or the second filter retainer (7*b*), whether configured as a cone (32), a truncated cone (33), or a stepped annular conical reduction (34), to increase a conical radius (32*a*), a truncated conical radius (33*a*) or a stepped annular conical radius (34*a*) of the first filter retainer (7*a*) or the second filter retainer (7*b*). The retainer radial extension external surface (61) can be configured as a cone (32), a truncated cone (33) or a stepped annular conical reduction (34), as above described, but including a greater conical radius (32*a*), a truncated conical radius (33*a*), stepped annular conical radius (34*a*). The retainer radial extension (60) can include a radial extension passthrough (62) which receives the first filter retainer second end (31*a*) or the second filter retainer second end (31*b*) to allow the retainer radial extension (60) to be disposed on and to cover the first filter retainer (7*a*) or the second filter retainer (7*b*).

A first filter retainer (7*a*) can be positioned on the tubular member (4). A first retainer radial extension (60*a*) can be positioned on the first filter retainer (7*a*) and the mated pair slidably engaged with a filter first end opening (29*a*) of a filter (8) with tubular mast closed end (6) passing through the filter second end opening (29*b*) of the filter (8). The second retainer radial extension (60*b*) can be positioned on a second filter retainer (7*b*) and the mated pair slidably engaged with a filter second end opening (29*b*). The first retainer radial extension (60*a*) and the second retainer radial extension (60*b*) can be disposed in fixed spatial relation on the tubular mast (4) to retain the filter (8) on the tubular mast (4). The filter (8) retained on the tubular mast (4) can rotate freely about the rod (3). In particular embodiments, as shown in the illustrative example of FIG. 15 the retainer radial extension(s) (60*a*, 60*b*) can be configured as truncated solid, wherein the retainer radial extension (60), whether formed as a cone (32), truncated cone (33), or stepped annular conical reduction (34), can include a pair of flat opposed sides (63, 64).

Now, with primary reference to FIGS. 4, 7, 10 through 13 and 16, which illustrate methods of making particular embodiments of the filter cleaning apparatus (1). The method of making the filter cleaning apparatus (1) includes one or more of: optionally providing a base (2), connecting a rod (3) to the base (2) or a support surface (9), inserting the rod (3) into a tubular mast (4) having a mast closed end (6), wherein the rod (3) inserted into the tubular mast (4) contacts the mast closed end (6), wherein the tubular mast (4) having the mast closed end (6) contacting the rod (3) can be adapted to rotate about the rod (3), and positioning a filter retainer (7) on the tubular mast (4).

In particular embodiments, the method of making the filter cleaning apparatus (1) can further include one or more of: extending a projection (21) from the mast closed end (6), wherein the projection (21) can be configured to contact the rod (3) inserted into the tubular mast (4), tapering the projection (21) approaching a projection end (22), wherein the projection end (22) can be configured to contact the rod (3) inserted into the tubular mast (4). The method making the filter cleaning apparatus (1) can further include tapering the projection (21) to a projection point (23), wherein the projection point (23) can be configured to contact the rod (3)

inserted into the tubular mast (4) or contact a central indentation (24) disposed in the rod second end (18) of the rod (3).

In particular embodiments, the method of making the filter cleaning apparatus (1) can further include retaining a bearing (25) at the mast closed end (6), the rod (3) inserted into the tubular mast (4) contacts the bearing (25). In certain embodiments, the bearing (25) can include rolling elements (26) between a pair of races (27, 28), and can comprise as illustrative examples a thrust bearing (25a) or a roller bearing (25b).

In particular embodiments, the method of making the filter cleaning apparatus (1) can further include configuring the filter retainer (7) to support a filter (8) on the tubular mast (4). In certain instances, the method incudes configuring the filter retainer (7) to insert in a filter end opening (29) of the filter (8) to support the filter (8) on the tubular mast (4) and can include one or more of: tapering the filter retainer (7) between a filter retainer first end (30) and a filter retainer second end (31), configuring the filter retainer (7) as a truncated cone (33), and configuring the filter retainer (7) as a stepped annular conical reduction (34) between a filter retainer first end (30) and a filter retainer second end (31).

In particular embodiments, the method of making the filter cleaning apparatus (1) can further include positioning a first filter retainer (7a) on the tubular mast (4) in adjustable fixed spatial relation to a second filter retainer (7b) on the tubular mast (4), wherein the first filter retainer (7a) and the second filter retainer (7b) can be adapted to insert in opposed filter end openings (29a, 29b) of a filter (8) to support the filter (8) on the tubular mast (4), and wherein at least one of the first filter retainer (7a) or the second filter retainer (7b) can comprise one of: a cone (32), a truncated cone (33), a stepped annular conical reduction (34), and a filter retainer collar (46). In particular embodiments, the method can further include disposing a plurality of flexibly resilient leaves (38) radially inwardly extending from the first filter retainer second end (30a), the plurality of flexibly resilient leaves (38) can be adapted to engage the tubular mast (4) and can further include disposing an annular disk (39) between a disk external annular surface (40) configured to secure to the first filter retainer first end (30a) and a disk internal annular surface (41) configured to slidably engage the tubular mast (4) or engage a mooring hub (42) having a tubular body (44) positioned along the tubular mast (4) and an annular shoulder (45) configured to support the annular disk (39).

In particular embodiments, the method of making the filter cleaning apparatus (1) can further include configuring a first filter retainer (7a) as: a truncated cone (33) disposed between a first filter retainer first end (30a) and a first filter retainer second end (31a), or a stepped annular conical reduction (34a) between the first filter retainer first end (30a) and the first filter retainer second end (31a), and configuring the second filter retainer (7b) as: a truncated cone (32) between a second filter retainer first end (30b) and a second filter retainer second end (31b), or a stepped annular conical reduction (34b) between the second filter retainer first end (30a) and the second filter retainer second end (31b).

In particular embodiments, the method of making the filter cleaning apparatus (1) can further include configuring the first filter retainer (7a) as: a truncated cone (33) disposed between a first filter retainer first end (30a) and a first filter retainer second end (31a), or a stepped annular conical reduction (34a) between the first filter retainer first end (30a) and the first filter retainer second end (31a), and configuring the second filter retainer (7b) as filter retainer collar (46) adapted to slidably engage the tubular mast (4).

In particular embodiments the method of making the filter cleaning apparatus (1) can further include connecting a mast axial extension (51) to the mast closed end (6) to increase a length of the tubular mast (4), wherein the mast axial extension (51) connected to the tubular mast (4) rotates about the rod (3).

In particular embodiments, the method of making the filter cleaning apparatus (1) can further include disposing a retainer radial extension (60) over the first filter retainer (7a) or the second filter retainer (7b) to increase a truncated conical radius (33a) or a stepped annular conical radius of the first filter retainer (34a) or the second filter retainer (7b). In particular instances, the method can further include disposing a passthrough (62) in the retainer radial extension (60), the passthrough (62) adapted to receive the first filter retainer first end (30a) or the second filter retainer first end (30b), wherein in particular embodiments, the method includes configuring the retainer radial extension (60) as truncated solid, wherein the conical or the stepped annular conical reduction (34) includes a pair of flat generally parallel sides (63, 64).

Now, with primary reference to FIGS. 1, 2, 5, and 14, the invention can include a method of using the filter cleaning apparatus (1) including: optionally positioning a base (2) on a support surface (9), connecting a rod (3) to the base (2) or to a support surface (9), inserting the rod (3) into a tubular mast (4) having a mast closed end (6), wherein the rod (3) inserted into the tubular mast (4) contacts the mast closed end (6), and positioning a filter retainer (7) on the tubular mast (4). The method of using the filter cleaning apparatus (1) can further include positioning a first filter retainer (7a) on the tubular mast (4) and positioning a second filter retainer (7b) on the tubular mast (4), wherein the first filter retainer (7a) can be disposed in adjustable fixed spatial relation to the second filter retainer (7b).

In particular embodiments, the method of using the filter cleaning apparatus (1) can include inserting a first filter retainer (7a) and inserting a second filter retainer (7b) in opposed filter end openings (29a, 29b) of a filter (8) to support the filter (8) on the tubular mast (4). In certain instances, at least one of the first filter retainer (29a) or the second filter retainer (29b) comprises a truncated cone (33) or a stepped annular conical reduction (34). In certain instances, at least one of the first filter retainer (7a) or the second filter retainer (7b) comprises a filter retainer collar (46), wherein the filter retainer collar (46) engages one of the opposed filter end openings (29a, 29b) of the filter (8) or resides in the filter interior space (50) of the filter (8).

In particular embodiments, the method of using the filter cleaning apparatus (1) includes slidably adjusting the first filter retainer (7a) or the second filter retainer (7b) on the tubular mast (4) to support a filter (8) on the tubular mast (4) between the first filter retainer (7a) and the second filter retainer (7b).

In particular embodiments, the method of using the filter cleaning apparatus (1) can include slidably engaging a mooring hub (42) to the tubular mast (4), the mooring hub (42) having an annular shoulder (45) circumferentially coupled to a tubular body (44) slidably positionable along the tubular mast (4) and securing an annular disk (39) to the first filter retainer first end (30a), wherein the annular disk (39) disposed between an external annular surface (40) configured to secure to the first filter retainer first end (30a) and an internal annular surface (41) configured to slidably engage the tubular mast (4) or the tubular body (44) of the mooring hub (42), wherein the annular shoulder (45) of the mooring hub (42) can support the annular disk (39). The method can further include, engaging a plurality of flexibly resilient leaves (38) radially inwardly extending from the first filter retainer second end (31b) with the tubular mast (4) and engaging the annular disk to the mooring hub (42).

In particular embodiments, the method of using the filter cleaning apparatus (1) can include disposing a retainer radial extension (60) over the first filter retainer (7a) or the second filter retainer (7b) to increase a truncated conical radius (33a) or a stepped annular conical radius (34a) of the first filter retainer (7a) or the second filter retainer (7b). The method can further include receiving the first filter retainer second end (31a) or the second filter retainer second end (31b) in a passthrough (62) disposed in the retainer radial extension (60).

In particular embodiments, the method of using the filter cleaning apparatus (1) can include connecting a mast axial extension (51) to the mast closed end (6) to increase a mast length of the tubular mast (4), wherein the mast axial extension (51) connected to the tubular mast closed end (6) rotates about the rod (3).

In particular embodiments, the method of using the filter cleaning apparatus (1) can include directing a fluid stream (65) on the filter (8) supported by one or more filter retainers (7) on the tubular mast (4). In certain instances, the force of fluid stream (65) directed on the filter (8) rotates the tubular mast (4) on the rod (3) and can correspondingly rotate the filter (8) in relation to the fluid stream (65). The method can further include cleaning the filter (8) with the fluid stream (65). In particular embodiments, the fluid stream (65) can comprise a liquid stream (66) or a gas stream (67).

As can be easily understood from the foregoing, the basic concepts of the present invention may be embodied in a variety of ways. The invention involves numerous and varied embodiments of a filer cleaning apparatus and methods for making and using such filter cleaning apparatus including the best mode.

As such, the particular embodiments or elements of the invention disclosed by the description or shown in the figures or tables accompanying this application are not intended to be limiting, but rather exemplary of the numerous and varied embodiments generically encompassed by the invention or equivalents encompassed with respect to any particular element thereof. In addition, the specific description of a single embodiment or element of the invention may not explicitly describe all embodiments or elements possible; many alternatives are implicitly disclosed by the description and figures.

It should be understood that each element of an apparatus or each step of a method may be described by an apparatus term or method term. Such terms can be substituted where desired to make explicit the implicitly broad coverage to which this invention is entitled. As but one example, it should be understood that all steps of a method may be disclosed as an action, a means for taking that action, or as an element which causes that action. Similarly, each element of an apparatus may be disclosed as the physical element or the action which that physical element facilitates. As but one example, the disclosure of a "retainer" should be understood to encompass disclosure of the act of "retaining"—whether explicitly discussed or not—and, conversely, were there is a disclosure of the act of "retaining", such a disclosure should be understood to encompass disclosure of a "retainer" and even a "means for retaining". Such alternative terms for each element or step are to be understood to be explicitly included in the description.

In addition, as to each term used it should be understood that unless its utilization in this application is inconsistent with such interpretation, common dictionary definitions should be understood to be included in the description for each term as contained in the Random House Webster's Unabridged Dictionary, second edition, each definition hereby incorporated by reference.

All numeric values herein are assumed to be modified by the term "about", whether or not explicitly indicated. For the purposes of the present invention, ranges may be expressed as from "about" one particular value to "about" another particular value. When such a range is expressed, another embodiment includes from the one particular value to the other particular value. The recitation of numerical ranges by endpoints includes all the numeric values subsumed within that range. A numerical range of one to five includes for example the numeric values 1, 1.5, 2, 2.75, 3, 3.80, 4, 5, and so forth. It will be further understood that the endpoints of each of the ranges are significant both in relation to the other endpoint, and independently of the other endpoint. When a value is expressed as an approximation by use of the antecedent "about," it will be understood that the particular value forms another embodiment. The term "about" generally refers to a range of numeric values that one of skill in the art would consider equivalent to the recited numeric value or having the same function or result. Similarly, the antecedent "substantially" means largely, but not wholly, the same form, manner or degree and the particular element will have a range of configurations as a person of ordinary skill in the art would consider as having the same function or result. When a particular element is expressed as an approximation by use of the antecedent "substantially," it will be understood that the particular element forms another embodiment.

Moreover, for the purposes of the present invention, the term "a" or "an" entity refers to one or more of that entity unless otherwise limited. As such, the terms "a" or "an", "one or more" and "at least one" can be used interchangeably herein.

Further, for the purposes of the present invention, the term "coupled" or derivatives thereof can mean indirectly coupled, coupled, directly coupled, connected, directly connected, or integrated with, depending upon the embodiment.

Additionally, for the purposes of the present invention, the term "integrated" when referring to two or more components means that the components (i) can be united to provide a one-piece construct, a monolithic construct, or a unified whole, or (ii) can be formed as a one-piece construct, a monolithic construct, or a unified whole. Said another way, the components can be integrally formed, meaning connected together so as to make up a single complete piece or unit, or so as to work together as a single complete piece or unit, and so as to be incapable of being easily dismantled without destroying the integrity of the piece or unit.

Thus, the applicant(s) should be understood to claim at least: i) each of the filter cleaning apparatuses herein disclosed and described, ii) the related methods disclosed and described, iii) similar, equivalent, and even implicit variations of each of these devices and methods, iv) those alternative embodiments which accomplish each of the functions shown, disclosed, or described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) methods and apparatuses substantially as described hereinbefore and with reference to any of the accompanying examples, x) the various combinations and permutations of each of the previous elements disclosed.

The background section of this patent application, if any, provides a statement of the field of endeavor to which the invention pertains. This section may also incorporate or contain paraphrasing of certain United States patents, patent applications, publications, or subject matter of the claimed invention useful in relating information, problems, or concerns about the state of technology to which the invention is drawn toward. It is not intended that any United States patent, patent application, publication, statement or other information cited or incorporated herein be interpreted, construed or deemed to be admitted as prior art with respect to the invention.

The claims set forth in this specification, if any, are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent application or continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon. The elements following an open transitional phrase such as "comprising" may in the alternative be claimed with a closed transitional phrase such as "consisting essentially of" or "consisting of" whether or not explicitly indicated the description portion of the specification.

Additionally, the claims set forth in this specification, if any, are further intended to describe the metes and bounds of a limited number of the preferred embodiments of the invention and are not to be construed as the broadest embodiment of the invention or a complete listing of embodiments of the invention that may be claimed. The applicant does not waive any right to develop further claims based upon the description set forth above as a part of any continuation, division, or continuation-in-part, or similar application.

We claim:

1. A filter cleaning apparatus, comprising:
   a base;
   a rod connected to said base;
   a tubular mast having a mast closed end opposite a mast open end, said rod inserted into said tubular mast open end contacts said tubular mast closed end, said tubular mast rotates about said rod;
   a filter retainer configured as a stepped annular conical reduction having a filter retainer first open end of lesser diameter opposite a filter retainer second open end of greater diameter, said filter retainer slidably positioned on said tubular mast with said filter retainer first open end facing said mast closed end; and
   a filter retainer collar slidably disposed on said tubular mast.

2. The apparatus of claim 1, further comprising an annular disk disposed between an external annular surface configured to secure to said filter retainer second open end and an internal annular surface configured to slidably engage said tubular mast.

3. The apparatus of claim 2, further comprising a mooring hub having a tubular body positioned along said tubular mast and an annular shoulder configured to engage said annular disk.

4. The apparatus of claim 1, further comprising a plurality of flexibly resilient leaves radially inwardly extending from said filter retainer first open end, said plurality of flexibly resilient leaves adapted to slidingly engage said tubular mast.

5. The apparatus of claim 1, further comprising a filter retainer radial extension disposed over said filter retainer to increase a stepped annular conical radius of said filter retainer.

6. The apparatus of claim 5, wherein said filter retainer radial extension includes a passthrough which receives said filter retainer first open end.

7. The apparatus of claim 6, wherein said filter retainer radial extension configured as truncated solid having a pair of flat sides.

8. The apparatus of claim 1, further comprising a projection extending from said mast closed end to terminate in a projection end, said projection end contacts said rod inserted into said tubular mast.

9. The apparatus of claim 8, wherein said projection tapers approaching said projection end.

10. The apparatus of claim 9, wherein said projection tapers to a point, said point contacts said rod inserted into said tubular mast.

11. The apparatus of claim 8, wherein said rod terminates in a rod end having a central indentation, said rod inserted into said tubular mast contacts said central indentation with said projection extending from said closed end of said tubular mast.

12. The apparatus of claim 1, wherein said mast closed end retains a bearing, said rod inserted into said tubular mast contacts said bearing.

13. The apparatus of claim 12, wherein said bearing includes rolling elements between a pair of races.

14. The apparatus of claim 13, wherein said bearing comprises a thrust bearing or a roller bearing.

15. The apparatus of claim 1, further comprising a mast axial extension configured to connect to said mast closed end to increase length of said tubular mast.

16. The apparatus of claim 15, wherein said mast axial extension coupled to said tubular mast rotates about said rod.

17. The apparatus of claim 1, wherein said filter retainer collar and said filter retainer adapted to insert into filter end openings of a filter.

18. The apparatus of claim 17, wherein said filter retainer collar adapted to engage one of said filter end openings of said filter.

19. The apparatus of claim 18, wherein said filter retainer and said filter retainer collar support a filter on said tubular mast.

* * * * *